United States Patent
Dettinger et al.

(10) Patent No.: US 8,285,736 B2
(45) Date of Patent: Oct. 9, 2012

(54) DISABLING QUERY CONDITIONS IN AN ABSTRACT QUERY ENVIRONMENT

(75) Inventors: Richard D. Dettinger, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/365,996

(22) Filed: Feb. 5, 2009

(65) Prior Publication Data

US 2009/0138452 A1 May 28, 2009

Related U.S. Application Data

(63) Continuation-in-part of application No. 11/226,181, filed on Sep. 14, 2005, now Pat. No. 8,180,787.

(51) Int. Cl.
*G06F 17/30* (2006.01)
(52) U.S. Cl. .......................... 707/759; 707/763
(58) Field of Classification Search .................. 707/759, 707/763
See application file for complete search history.

(56) References Cited

U.S. PATENT DOCUMENTS

| | | | |
|---|---|---|---|
| 5,253,362 A | 10/1993 | Nolan et al. | |
| 5,630,121 A | 5/1997 | Braden-Harder et al. | |
| 5,734,887 A * | 3/1998 | Kingberg et al. | 707/999.004 |
| 6,009,422 A | 12/1999 | Ciccarelli | |
| 6,233,586 B1 | 5/2001 | Chang et al. | |
| 6,457,009 B1 | 9/2002 | Bollay | |
| 6,460,043 B1 | 10/2002 | Tabbara et al. | |
| 6,553,368 B2 | 4/2003 | Martin et al. | |
| 6,601,065 B1 | 7/2003 | Nelson et al. | |
| 6,725,227 B1 | 4/2004 | Li | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,096,229 B2 | 8/2006 | Dettinger et al. | |
| 7,149,730 B2 * | 12/2006 | Mullins et al. | 707/999.002 |
| 7,363,287 B2 * | 4/2008 | Kilmer et al. | 707/999.002 |
| 2002/0078068 A1 | 6/2002 | Krishnaprasad et al. | |
| 2003/0220893 A1 | 11/2003 | Dettinger et al. | |
| 2005/0004911 A1 * | 1/2005 | Goldberg et al. | 707/7 |
| 2006/0010127 A1 | 1/2006 | Dettinger et al. | |
| 2006/0095407 A1 * | 5/2006 | Ortega et al. | 707/3 |
| 2006/0224959 A1 * | 10/2006 | McGuire et al. | 715/700 |

(Continued)

OTHER PUBLICATIONS

U.S. Appl. No. 12/767,442, filed Apr. 26, 2010.

(Continued)

*Primary Examiner* — Rehana Perveen
*Assistant Examiner* — Tiffany Thuy Bui
(74) *Attorney, Agent, or Firm* — Patterson & Sheridan LLP

(57) ABSTRACT

Embodiments of the invention provide techniques for temporarily disabling conditions in abstract queries. In one embodiment, a query interface is configured to present an abstract query, and to allow a user to select conditions of the abstract query to be temporarily disabled. By executing an abstract query having disabled conditions, the user may be able to determine the effect of individual changes to the abstract query without having to re-compose the abstract query after each change. The conditions to be disabled may be selected individually, by field, or by value. Each disabled element may be displayed with a visual indicator communicating that it is disabled. The user may then select specific disabled conditions to be re-enabled.

18 Claims, 9 Drawing Sheets

U.S. PATENT DOCUMENTS

2009/0138456 A1    5/2009    Dettinger et al.

OTHER PUBLICATIONS

U.S. Appl. No. 12/767,497, filed Apr. 26, 2010.
Llama, "Search Code: Search Your Database," <http://www.codewalkers.com/c/a/Search-Code/Search-Your-Database/>, retrieved Mar. 23, 2009, pp. 1-4.
Meng et al., "A Theory of Translation From Relational Queries to Hierarchical Queries," *IEEE Transactions on Knowledge and Data Engineering*, Apr. 1995, vol. 7(2): pp. 228-245.
Office Action History for U.S. Appl. No. 10/083,075 from Nov. 26, 2004 to Sep. 1, 2005.
Office Action History for U.S. Appl. No. 11/226,181 from Mar. 25, 2009 to Aug. 10, 2010.

* cited by examiner

DISABLING QUERY CONDITIONS IN AN ABSTRACT QUERY ENVIRONMENT

CROSS-REFERENCE TO RELATED APPLICATIONS

This application is a continuation-in-part of co-pending U.S. patent application Ser. No. 11/226,181, filed Sep. 14, 2005. The aforementioned patent is herein incorporated by reference in its entirety.

BACKGROUND OF THE INVENTION

1. Field of the Invention

The invention generally relates to computer database systems. More particularly, the invention relates to techniques for temporarily disabling conditions in abstract queries.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Queries of a relational database may specify which data items should be retrieved, how to join various data items, and conditions (predicates) that must be satisfied for a particular data item to be included in a query result table.

The complexity of constructing a query statement, however, generally makes it difficult for average users to compose queries of a relational database. Because of this complexity, users often turn to database query applications to assist them in composing queries of a database. One technique for managing the complexity of a relational database, and the SQL query language, is to use a database abstraction model. Generally, a database abstraction model is constructed from logical fields that map to data stored in the underlying physical database. Data abstraction models may be used to implement abstract rules. Abstract rules specify predicates and actions, and are composed with reference to logical fields. Abstract rules may be executed in a rule engine in order to perform an analysis routine.

SUMMARY OF THE INVENTION

One embodiment of the invention includes a computer-implemented method. The method may generally include presenting, in a query interface, an abstract query comprising a plurality of conditional expressions arranged within multiple nested logical levels separated by one or more logical operators and also include receiving a selection of a first conditional expression of the plurality of conditional expressions and a command type. The method may further include identifying, based on a first logical field included in the first conditional expression and the command type, a subset of one or more conditional expressions, of the plurality of conditional expressions. The method may further include presenting the abstract query in the query interface. The subset of one or more conditional expressions may be presented with an indication communicating that each conditional expression in the subset is disabled, such that each of the one or more disabled conditional expressions is maintained in a respective original location of the user interface.

Another embodiment of the invention includes a computer-readable storage medium containing a program, which when executed, performs an operation for selectively disabling query conditions in an abstract query. The operation may generally include presenting, in a query interface, an abstract query comprising a plurality of conditional expressions arranged within multiple nested logical levels separated by one or more logical operators and also include receiving a selection of a first conditional expression of the plurality of conditional expressions and a command type. The operation may further include identifying, based on a first logical field included in the first conditional expression and the command type, a subset of one or more conditional expressions, of the plurality of conditional expressions. The operation may further include presenting the abstract query in the query interface. The subset of one or more conditional expressions may be presented with an indication communicating that each conditional expression in the subset is disabled, such that each of the one or more disabled conditional expressions is maintained in a respective original location of the user interface.

Still another embodiment of the invention includes a system having a processor and a memory containing a program, which when executed on the processor, performs an operation for selectively disabling query conditions in an abstract query. The operation may generally include presenting, in a query interface, an abstract query comprising a plurality of conditional expressions arranged within multiple nested logical levels separated by one or more logical operators and also include receiving a selection of a first conditional expression of the plurality of conditional expressions and a command type. The operation may further include identifying, based on a first logical field included in the first conditional expression and the command type, a subset of one or more conditional expressions, of the plurality of conditional expressions. The operation may further include presenting the abstract query in the query interface. The subset of one or more conditional expressions may be presented with an indication communicating that each conditional expression in the subset is disabled, such that each of the one or more disabled conditional expressions is maintained in a respective original location of the user interface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
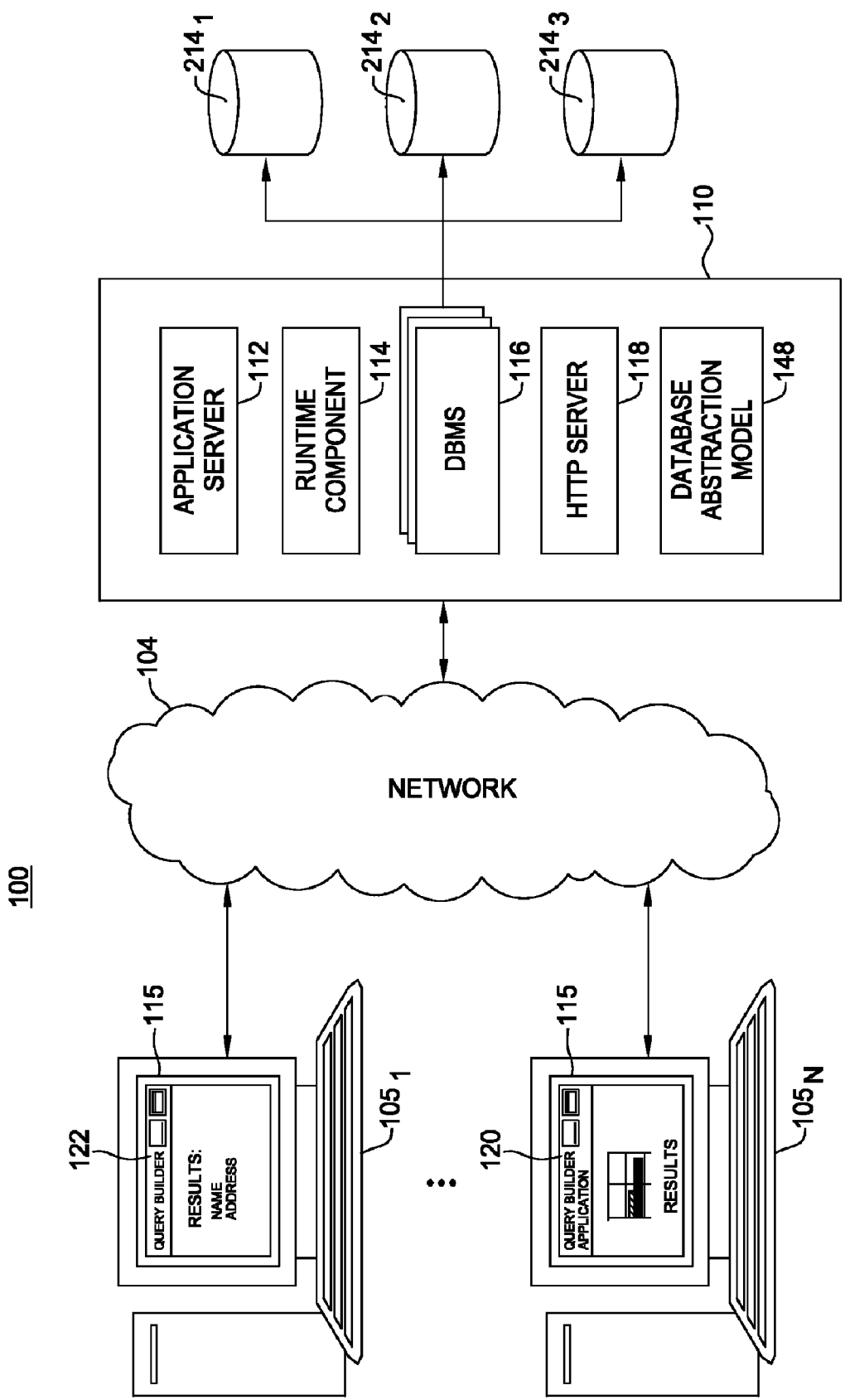
FIG. 1 illustrates a network environment using a client-server configuration, according to one embodiment of the invention.

A database abstraction model is constructed from logical fields that map to data stored in the underlying physical database. Each logical field defines an access method that specifies a location (e.g., a table and column) in the underlying database from which to retrieve data for a given logical field. Users compose an abstract query by selecting logical fields and specifying conditions. Data is retrieved from the physical database by generating a resolved query (e.g., an SQL statement) from the abstract query. Because the database abstraction model is not tied to the syntax or semantics of the physical database or query language, additional capabilities may be provided by the database abstraction model without having to modify the underlying database.

In some situations, composing an abstract query can become a complex and confusing process. For example, an abstract query may require multiple conditions (i.e., conditional expressions) joined by logical operators (e.g., AND, OR). Further, such an abstract query, when initially composed, may not produce the desired results due to errors in the query, missing conditions, and the like. Thus, a user composing such an abstract query may have to undergo multiple iterations of modifying the abstract query and viewing results, before finally composing the desired abstract query. However, such an iterative process may be tedious and inefficient, as conditions may have to be added and removed to/from the query multiple times, thus wasting effort and confusing the user.

Embodiments of the invention provide techniques for temporarily disabling conditions in abstract queries. In one embodiment, a query interface is configured to present an abstract query and to allow a user to select conditions of the abstract query to be temporarily disabled. By executing an abstract query with disabled conditions, the user may be able to determine the effect of individual changes to the abstract query without having to re-compose the abstract query after each change. The conditions to be disabled may be selected individually, by field, or by value. Each disabled element may be displayed with a visual indicator communicating that it is disabled. The user may then select specific disabled conditions to be re-enabled (i.e., to no longer be disabled).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using an application server 112 interacting with HTTP server 118 to service HTTP requests. In another embodiment, client application 120 may comprise a database front-end, or query application program running on client system $115_N$. The web-browser 122 and application 120 may be configured to allow a user to compose an abstract query, and to submit the query to the runtime component 114 for processing.

As illustrated in FIG. 1, server system 110 may further include a runtime component 114, a database management system (DBMS) 116, and a database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing. In one embodiment, users compose an abstract query from the logical fields defined by the database abstraction model 148. Logical fields and access methods are described in greater detail below in reference to FIGS. 2A-2B.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

Figure 2A:
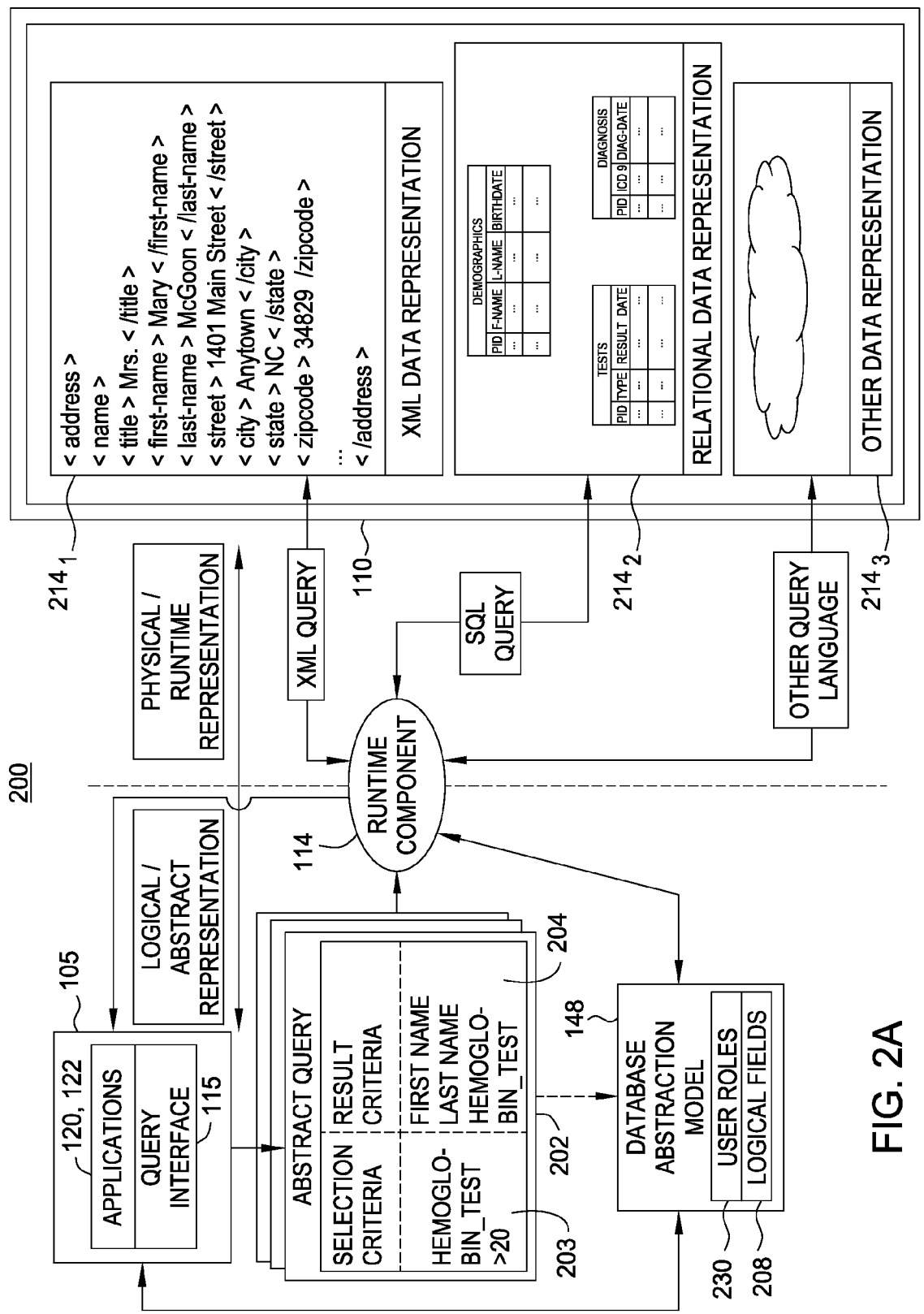
FIGS. 2A-2C illustrate a logical view of a database abstraction model constructed over an underlying physical database, according to one embodiment of the invention.

FIG. 2A illustrates a plurality of interrelated components of a database abstraction model, along with relationships between the logical view of data provided by the abstraction model environment (the left side of FIG. 2A), and the underlying physical database mechanisms used to store the data (the right side of FIG. 2A).

In one embodiment, users compose an abstract query 202 using the user interface 115. An abstract query 202 is generally referred to as "abstract" because it is composed using logical fields rather than direct references to data structures in the underlying physical databases 214. In one embodiment, the abstract query 202 is composed using logical fields 208 included in the database abstraction model 148. The logical fields 208 include specifications of access methods for mapping to a physical view of the data, including various underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed).

In one embodiment, the database abstraction model 148 may also define a set of user roles 230, representing metadata describing defined categories of users of the database abstraction model 148. For example, assume a database abstraction model 148 configured for use at a medical research hospital. In this example, various types of users (e.g., developers, technicians, doctors, researchers, accountants, etc.) may require access to different types of information stored in the database abstraction model 148. In one embodiment, each user may be assigned to a particular user role 230 defined as having access to particular logical fields. User roles 230 are described in greater detail below with reference to FIG. 2C.

Figure 2B:
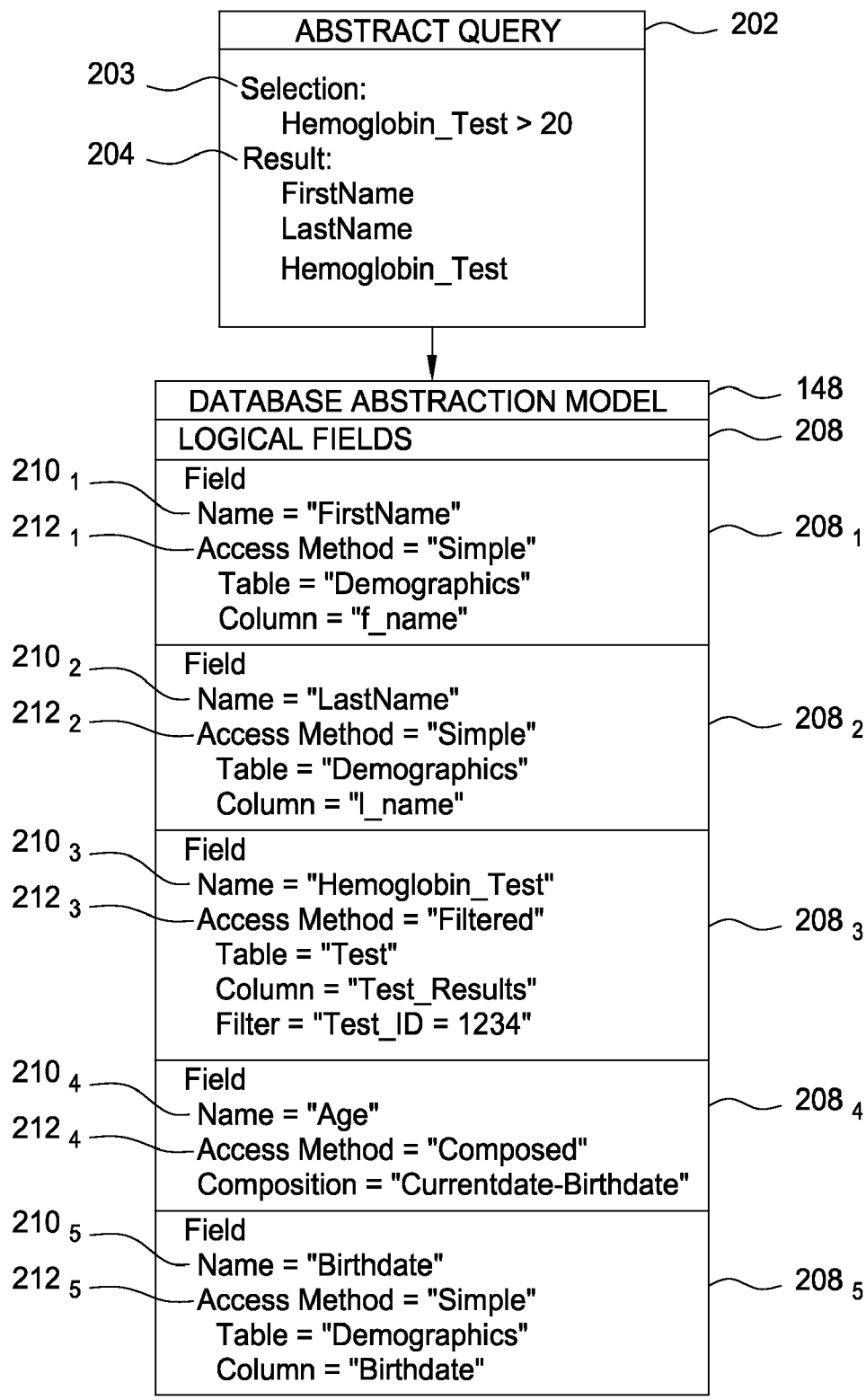

FIG. 2B illustrates an embodiment of the database abstraction model 148 that includes a plurality of logical field specifications $208_{1-5}$ (five shown by way of example). The access methods included in a given logical field specification 208 (or logical field, for short) provide a mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$ and $208_5$ provide simple access methods $212_1$, $212_2$ and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field specification $208_3$ specifies a filtered field 210₃ named "Hemoglobin_Test." The access method for filtered field 210₃ maps to data stored in a "Tests" tests table. More specifically, the filtered field 210₃ is specified in terms of a column storing the test names (i.e., Name Column="Test_ID"), a column storing test values (i.e., Value Column="Test_Results"), and a filter specifying a particular test name (i.e., Filter="1234"). Only data records that satisfy the filter (i.e., records having the value "1234" in the "Test_ID" column) are returned for this logical field. Accordingly, the filtered field 210₃ returns a subset of data from a larger set, without the user having to know the specifics of how the data is represented in the underlying physical database, or having to specify the selection criteria as part of the query building process.

Field specification 208₄ exemplifies a composed access method 212₄. Composed access methods generate a return value by retrieving data from the underlying physical database and performing operations on the data. In this way, information that does not directly exist in the underlying data representation may be computed and provided to a requesting entity. For example, logical field access method 212₄ illustrates a composed access method that maps the logical field "age" 208₄ to another logical field 208₅ named "birthdate." In turn, the logical field "birthdate" 208₅ maps to a column in a demographics table of relational database 214₂. In this example, data for the "age" logical field 208₄ is computed by retrieving data from the underlying database using the "birthdate" logical field 208₅, and subtracting a current date value from the birth date value to calculate an age value returned for the logical field 208₄. Another example includes a "name" logical filed (not shown) composed from the first name and last name logical fields 208₁ and 208₂.

By way of example, the field specifications 208 shown in FIG. 2B are representative of logical fields mapped to data represented in the relational data representation 214₂. However, other instances of the data repository abstraction component 148 or, other logical field specifications, may map to other physical data representations (e.g., databases 214₁ or 214₃ illustrated in FIG. 2A). Further, in one embodiment, the database abstraction model 148 is stored on computer system 110 using an XML document that describes the logical fields, access methods, and additional metadata that, collectively, define the database abstraction model 148 for a particular physical database system. Other storage mechanisms or markup languages, however, are also contemplated.

Figure 2C:
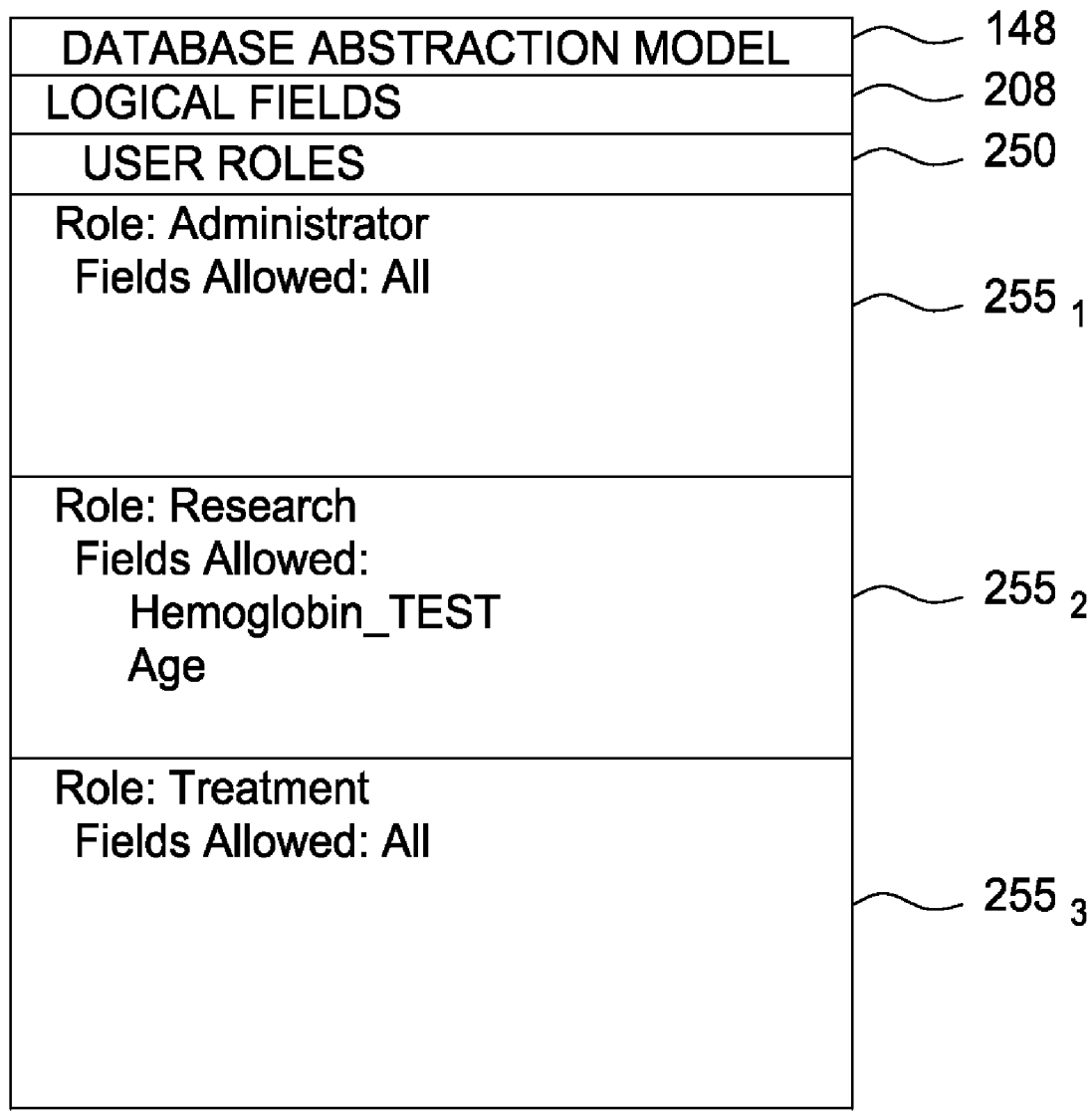

FIG. 2C illustrates additional metadata stored by database abstraction model used to mange access to logical fields by user roles, according to one embodiment of the invention. As shown, the database abstraction model 148 includes the logical fields 208 of FIG. 2B. The database abstraction model 148 also includes a section for user roles 250. In this example, each user role includes a positive list of what logical fields 208 a user may include in an abstract query. Illustratively, the user roles 250 include a role for an administrator group of users (role 255₁), a role for a research group of users (role 255₂), and a role for a "treatment" group of users (role 255₃). As shown, users in an administrator role (role 255₁) may access "ALL" logical fields; users in the research role (role 255₂) may access only the "hemoglobin_test" and the "age" logical fields; and users in an "treatment" role (role 255₃) (such as treating physician) can access "ALL" logical fields. Of course, other approaches may be used, e.g., a negative list indicating what logical field s 208 a user is prohibited from accessing. Further, access restrictions, (whether positive or negative) may be more granular, e.g., a researcher might be allowed to user to include the "Birth date" logical field as part of a query condition, but not display this information in query results.

Figure 3:
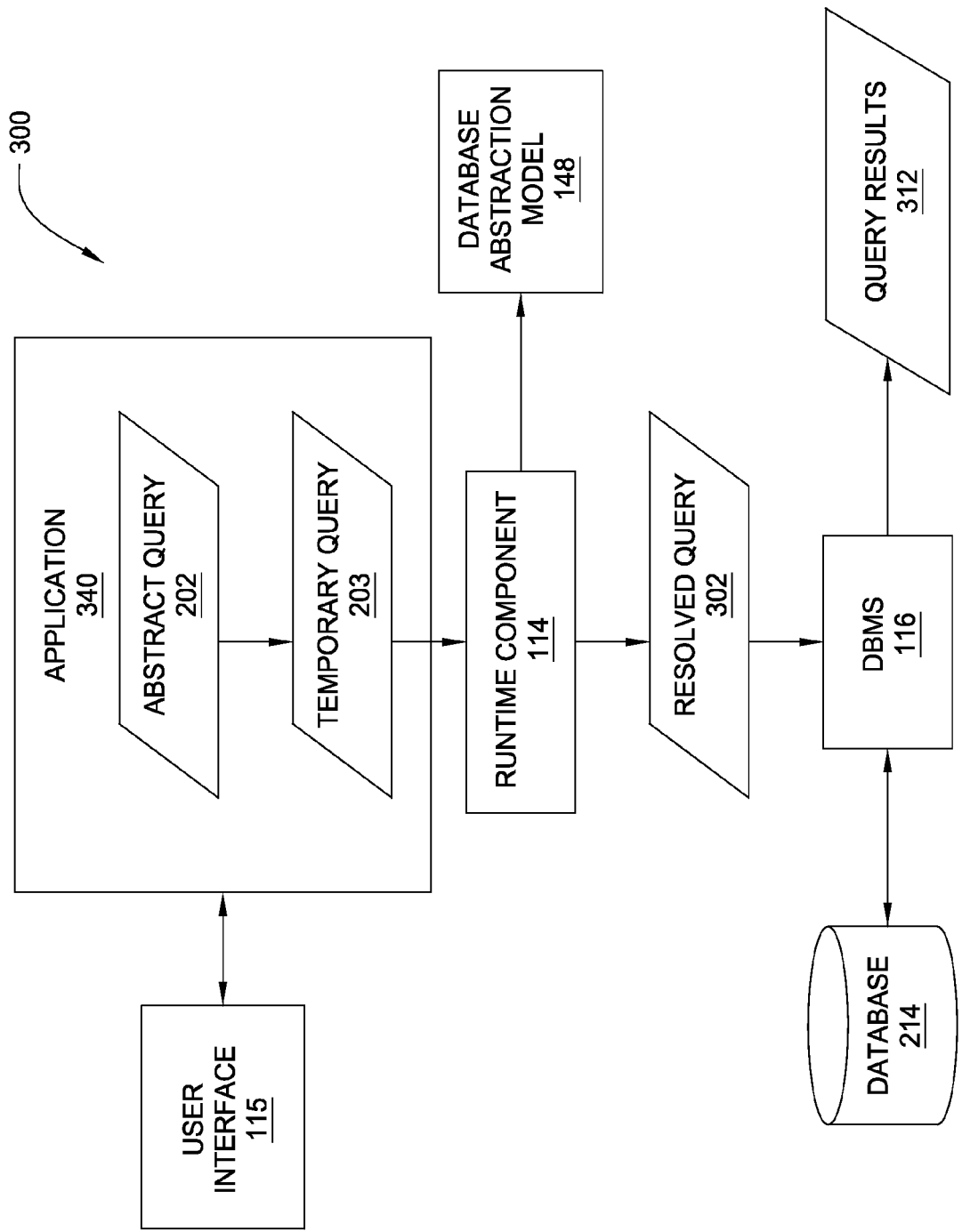
FIG. 3 illustrates a relational view of software components for executing an abstract query, according to one embodiment of the invention.

FIG. 3 illustrates a relational view 300 of software components for executing an abstract query, according to one embodiment of the invention. The software components of relational view 300 include user interface 115, application 340, runtime component 114, database management system (DBMS) 116, database 214, and database abstraction model 148.

As shown, the application 340 includes an abstract query 202 and a temporary query 203. Illustratively, the abstract query 202 is composed in the user interface 115, which in this example is a graphical user interface. In one embodiment, the user interface 115 may display the abstract query 202, and may enable a user to select conditions of the abstract query to be disabled. That is, the user may select conditions that remain in the abstract query 202, but that are ignored in producing query results. Thus, when such an abstract query is executed, the user may be able to determine the effect of individual conditions without having to repeatedly recompose the abstract query. In one embodiment, the temporary query 203 may be generated from the rest of the abstract query 202 (i.e., any conditions of the abstract query 202 that are not disabled). The disabling of query conditions is described in greater detail below with reference to FIGS. 4 and 5A-5C.

The temporary query 203 is translated by the runtime component 114 into a resolved query 302. This translation is performed with the use of the database abstraction model 148, as described above with reference to FIGS. 2A-2B. The resolved query 302 is submitted to the DBMS 116 for execution against the database 214, thus producing a set of query results 312. The query results 312 may be presented to the user, e.g., in user interface 115.

Of course, the above examples are provided for illustrative purposes only, and are not intended to limit the scope of the invention. It should also be noted that the components of the relational view 300 are illustratively shown as separate software components. However, embodiments are contemplated in which functionality of any component may be incorporated in other component(s).

Figure 4:
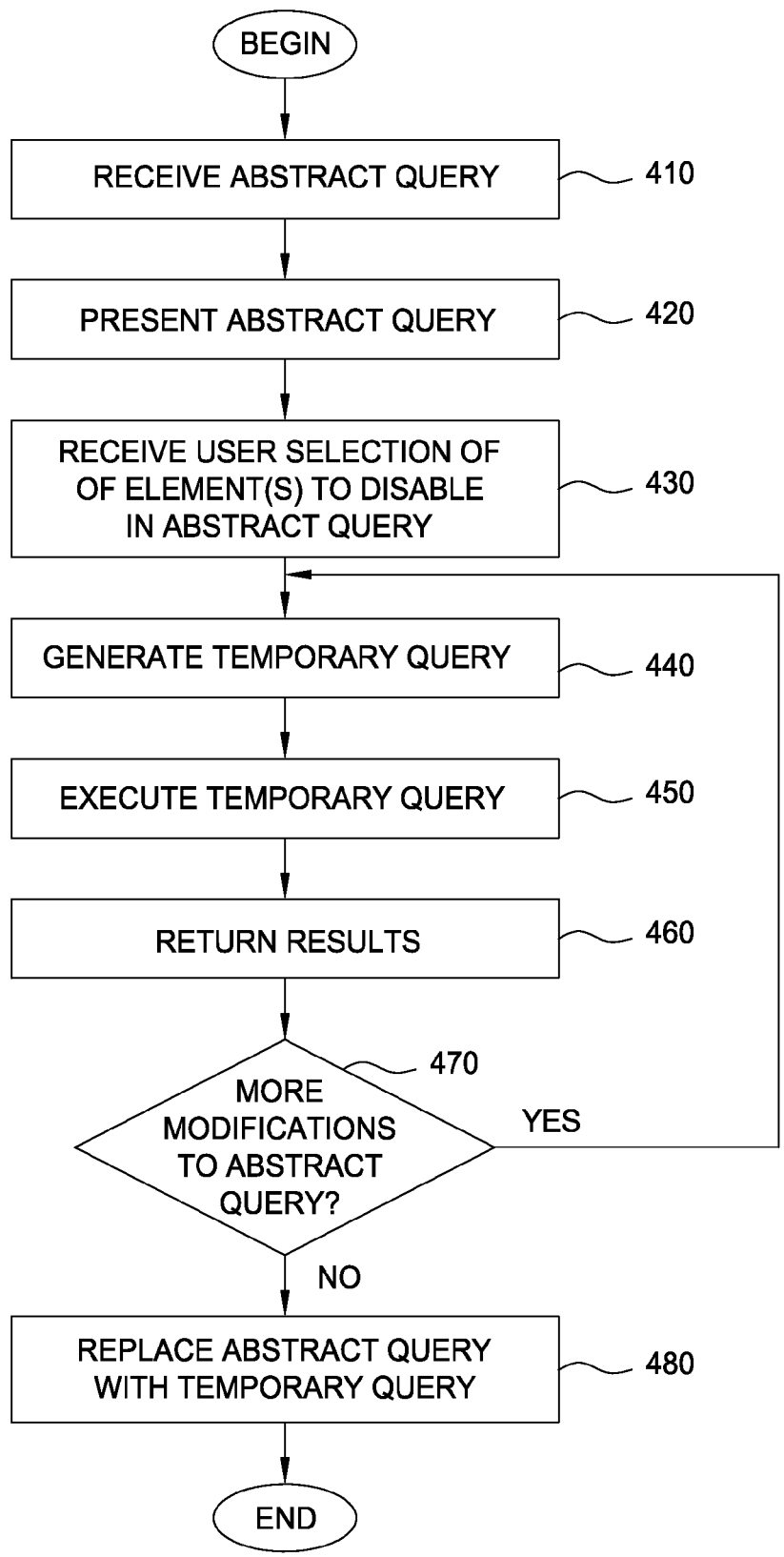
FIG. 4 is a flow diagram illustrating a method for disabling conditions in an abstract query, according to one embodiment of the invention.

FIG. 4 is a flow diagram illustrating a method 400 for disabling conditions in an abstract query, according to one embodiment of the invention. For the sake of illustration, the method 400 is described in conjunction with systems illustrated in FIGS. 1, 2A-2B, 3, and 5A-5B. Specifically, the steps of method 400 may be assumed to be performed by the runtime component 114 illustrated in FIG. 1. However, persons skilled in the art will understand that any system configured to perform the steps of the method, in any order, is within the scope of the present invention.

FIG. 4 is a flow diagram illustrating a method for disabling conditions in an abstract query, according to one embodiment of the invention. For the sake of illustration, the method 400 is described in conjunction with systems illustrated in FIGS. 1, 2A-2B, 3, and 5A-5B. Specifically, the steps of the depicted method may be assumed to be performed by the runtime component 114 illustrated in FIG. 1. However, persons skilled in the art will understand that any system configured to perform the steps of the depicted method, in any order, is within the scope of the present invention.

The depicted method begins at step 410 by receiving an abstract query. For example, the abstract query 202 (shown in FIG. 3) may be composed by a user interacting with the user interface 115 (as shown in FIG. 3), may be a predefined abstract query that is retrieved from a database, and the like.

At step 420, the abstract query may be presented to a user. For example, referring to FIG. 5A, a user interface 115 displays an abstract query 202. As shown, the abstract query 202 is composed of four conditional sections 510, 520, 530, 540 that are connected by logical operators (i.e., AND, OR), with each conditional section including multiple conditions. For example, the conditional section 530 includes the conditions "TEST_B IS GREATER THAN 234," "TEST_AGE IS BETWEEN 36 AND 72," and "TEST_COUNTRY IS CANADA." Note that the abstract query 202 is a simplified example, and that actual abstract queries may be much more complex (i.e., may include more conditions, may include more logical operators, may have several layers of nested logic, etc.).

In contrast, if the user selects the command 554 "DISABLE BY VALUE," the condition 560 as well as any other conditions having the same field and values (e.g., condition "WHERE DIAGNOSIS AGE IS BETWEEN 18 AND 35") may be disabled. That is, the "DISABLE BY VALUE" condition 560 may be selected to disable both the selected condition for the "DIAGNOSIS_AGE" logical field, as well as other instances of the same field that have the same value (between 18 and 35 in this example).

Similarly, if the user selects the command 556 "DISABLE BY FIELD," the condition 560 as well as any other conditions based on the field "DIAGNOSIS_AGE" (e.g., condition "WHERE DIAGNOSIS AGE IS BETWEEN 18 AND 35") may be disabled. That is, unlike the "DISABLE BY VALE command 554, the "DISABLE BY FIELD" command 556 may be selected to disable each occurrence of a logical field in the query.

Figure 5A:
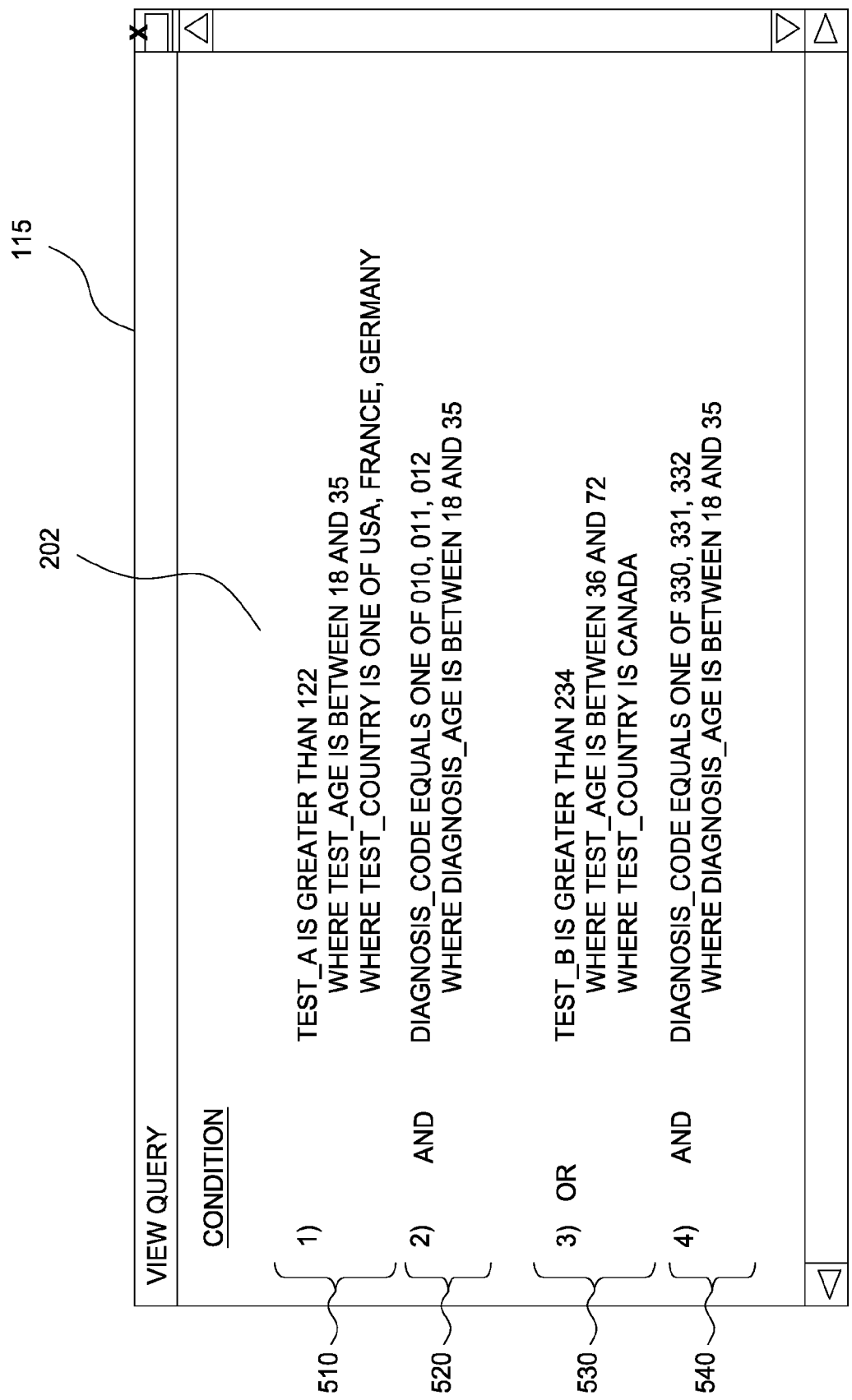
FIGS. 5A-5C illustrate a user interface configured to enable a user to disabling conditions in an abstract query, according to one embodiment of the invention.
Figure 5B:
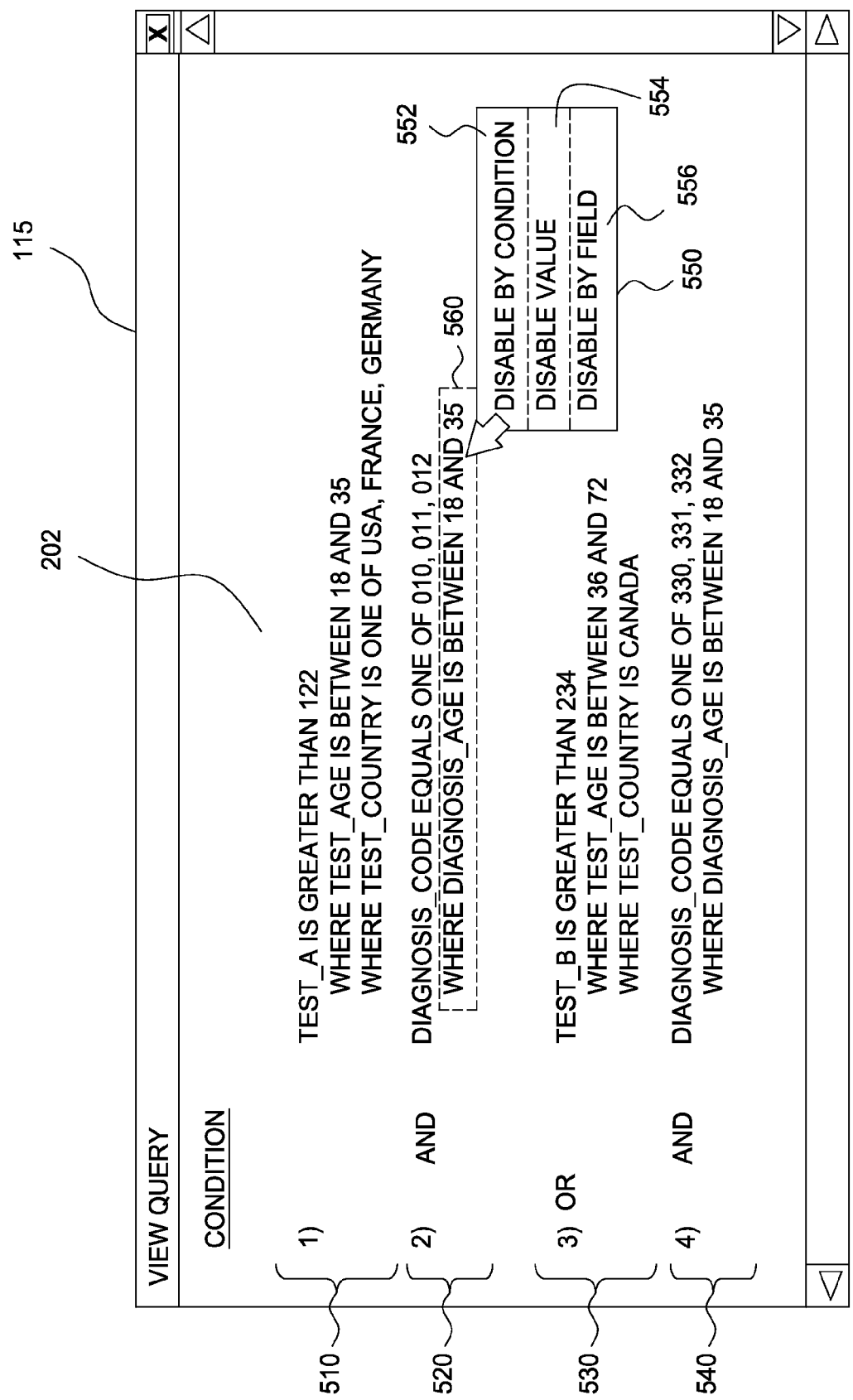
Figure 5C:
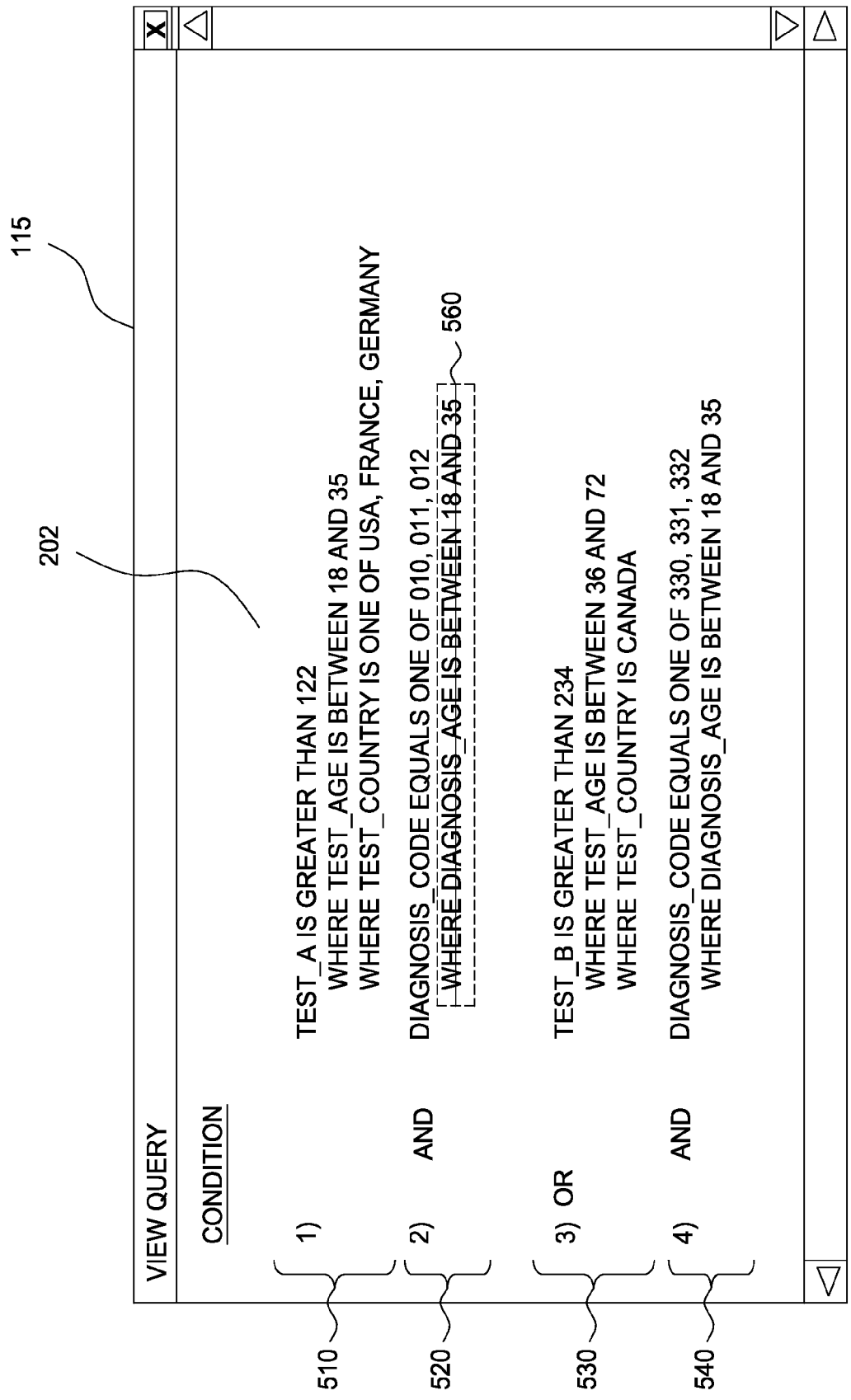

For the sake of illustration, assume that the user selects the command 552 "DISABLE BY CONDITION," thus only disabling the condition 560. In one embodiment, the user interface 115 displays any disabled conditions with an indicator to communicate that the condition is disabled. For example, as shown in FIG. 5C, the condition 560 is shown with a struck-out font, thus indicating that the condition 560 is disabled. Of course, it is contemplated that other indications may also be used to communicate that a condition is disabled, for example font colors, background colors, different fonts, symbols or text overlaid or next to the disabled condition (e.g., an "X" overlaid on the disabled condition), and the like.

Of course, the commands for selecting conditions to be disabled discussed above are provided as examples, and are not intended to limit the invention. It is contemplated that other techniques for selecting conditions may be utilized. For example, a user may perform a command to disable every condition in an abstract query other than a selected condition (e.g., condition 560). In another example, a user may perform a command to disable every condition in an abstract query that has a field and/or values different from a selected condition. In yet another example, the user may perform a command to disable every condition in an abstract query, and may then select individual conditions to be re-enabled. Further, metadata associated with either the underlying physical database system or the database abstraction model may be used to select a subset of query conditions to disable (in response to user input).

A command based on physical metadata could include a command to disable conditions referencing logical fields that each map to the same physical table (or other underlying structure of the database). For example, FIG. 2B includes an example of a "FirstName" logical filed 208$_1$ and a "LastName" logical field 208$_2$ that each map to a physical table named "Demographics." A command to disable a query condition based on underlying physical metadata used to disable the "FirstName" logical field 208$_1$ would also disable a condition including the "LastName" logical field 208$_2$. Such a command could be useful when modeling the database to disable all the logical conditions dependant on that physical table.

Similarly, the user interface may allow users to remove conditions based logical metadata defined by the database abstraction model. For example, selecting conditions on compatible logical fields would be another useful way to select a group of conditions. For example, metadata in the database abstraction model could indentify relationships between logical fields (e.g., relationships between similar medical tests). In such a case, a command to disable compatible logical fields issued by selecting one logical field (e.g., the "Hemoglobin_Test" logical field 208) could also disable other logical fields mapping to medical test results.

As another example, conditions may be disabled based on logical field inaccessibility for users based on user roles. As discussed above in conjunction with FIG. 2C, the database abstraction model may grant (and/or deny) access to logical fields 208 based on user roles. Using the example, "administrator," "research," and "treatment" roles of FIG. 2C, the command interface could allow a user to disable query conditions in an abstract based on the access allowed to certain user roles. In such a case, an user in the role of "administrator" could compose a query and then issue a command to disable conditions inacceable by users in the "research" role.

Removing conditions on logical fields not accessible by the "research" role allows users to examine what the result is of the query when it is modified to be used by a user in that role.

Referring again to FIG. 4, at step 440, a temporary query 203 may be generated to represent the abstract query 202 minus any disabled conditions. For example, the temporary query 203 may be generated to represent the abstract query 202 shown in FIG. 5B minus the disabled condition 560. At step 450, the temporary query 203 may be executed. At step 460, the results of executing the temporary query 203 may be returned. For example, the query results may be displayed in user interface 115. The query results may be generated when the runtime component 114 retrieves data from the physical database 214 by generating a resolved query (e.g., an SQL statement) from the temporary query 203.

At step 470, it may be determined whether there are any more modifications to the abstract query 202. For example, the user may perform a command in the user interface 115 to indicate whether there are any more changes to the abstract query 202. If so, the method 400 repeats at step 440. However, if it is determined at step 470 that there are no more modifications to the abstract query 202, the method continues at step 480, where the abstract query 202 may be replaced with the temporary query 203. For example, the user may specify that the abstract query 202 shown in the user interface 115, including any disabled conditions, is to be saved as a new version of the abstract query. Thus, the temporary query 203 may be saved within the database abstraction model 148 in place of the abstract query 202. After step 480, the depicted method terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
 presenting, in a query interface, an abstract query comprising a plurality of conditional expressions arranged within multiple nested logical levels separated by one or more logical operators, wherein the plurality of conditional expressions is defined in an abstraction model that defines logical fields that model underlying physical data, wherein each of the defined logical fields is associated with a respective access method specifying a manner of mapping the logical field to a corresponding one or more physical fields of the underlying physical data, and wherein the respective access method is selected from two or more different types of access methods;

receiving a selection, from the plurality of conditional expressions, of one or more conditional expressions to be disabled in the abstract query;

presenting the abstract query in the query interface, wherein each of the selected one or more conditional expressions is presented with an indication communicating that the respective conditional expression is disabled, such that each of the selected one or more conditional expressions is maintained in a respective original location within the multiple nested logical levels of the abstract query;

executing the abstract query excluding the selected one or more conditional expressions, comprising:
   generating a temporary abstract query based on the abstract query and the selected one or more conditional expressions, wherein the temporary abstract query excludes the selected one or more conditional expressions;
   transforming the generated temporary abstract query into an executable query; and
   executing the executable query against the underlying physical data to produce a set of query results;
and
returning the set of query results of executing the abstract query to the query interface.

2. The computer-implemented method of claim 1, wherein transforming only a portion of the abstract query is performed on the basis of the abstraction model.

3. The computer-implemented method of claim 1, wherein presenting each of the one or more conditional expressions with an indication comprises presenting each of the one or more conditional expressions in a struck-out font.

4. The computer-implemented method of claim 1, wherein the presented indication communicating that the respective conditional expression is disabled comprises one of: (i) a font color, (ii) a background color, and (iii) a symbol.

5. The computer-implemented method of claim 1, wherein any of the one or more conditional expressions may be selectively re-enabled by the user within the query interface.

6. The computer-implemented method of claim 1, further comprising permanently removing the one or more conditional expressions from the abstract query.

7. A non-transitory computer readable medium containing a program for processing an abstract rule, when executed, performs an operation, comprising:

presenting, in a query interface, an abstract query comprising a plurality of conditional expressions arranged within multiple nested logical levels separated by one or more logical operators, wherein the plurality of conditional expressions is defined in an abstraction model that defines logical fields that model underlying physical data, wherein each of the defined logical fields is associated with a respective access method specifying a manner of mapping the logical field to a corresponding one or more physical fields of the underlying physical data, and wherein the respective access method is selected from two or more different types of access methods;

receiving a selection, from the plurality of conditional expressions, of one or more conditional expressions to be disabled in the abstract query;

presenting the abstract query in the query interface, wherein each of the selected one or more conditional expressions is presented with an indication communicating that the respective conditional expression is disabled, such that each of the selected one or more conditional expressions is maintained in a respective original location within the multiple nested logical levels of the abstract query;

executing the abstract query excluding the selected one or more conditional expressions, comprising:
   generating a temporary abstract query based on the abstract query and the selected one or more conditional expressions, wherein the temporary abstract query excludes the selected one or more conditional expressions;
   transforming the generated temporary abstract query into an executable query; and
   executing the executable query against the underlying physical data to produce a set of query results;
and
returning a set of results of executing the abstract query to the query interface.

8. The non-transitory computer readable medium of claim 7, wherein transforming only a portion of the abstract query is performed on the basis of the abstraction model.

9. The non-transitory computer readable medium of claim 7, wherein presenting each of the one or more conditional expressions with an indication comprises presenting each of the one or more conditional expressions in a struck-out font.

10. The non-transitory computer readable medium of claim 7, wherein the presented indication communicating that the respective conditional expression is disabled comprises one of: (i) a font color, (ii) a background color, and (iii) a symbol.

11. The non-transitory computer readable medium of claim 7, wherein any of the one or more conditional expressions may be selectively re-enabled by the user within the query interface.

12. The non-transitory computer readable medium of claim 7, further comprising permanently removing the one or more conditional expressions from the abstract query.

13. A system, comprising:
a processor; and
a memory containing a program, which when executed on the processor, performs an operation, comprising:
   presenting, in a query interface, an abstract query comprising a plurality of conditional expressions arranged within multiple nested logical levels separated by one or more logical operators, wherein the plurality of conditional expressions is defined in an abstraction model that defines logical fields, wherein each of the defined logical fields is associated with a respective access method specifying a manner of mapping the logical field to a corresponding one or more physical fields of the underlying physical data, and wherein the respective access method is selected from two or more different types of access methods;
   receiving a selection, from the plurality of conditional expressions, of one or more conditional expressions to be disabled in the abstract query;
   presenting the abstract query in the query interface, wherein each of the selected one or more conditional expressions is presented with an indication communicating that the respective conditional expression is disabled, such that each of the selected one or more conditional expressions is maintained in a respective original location within the multiple nested logical levels of the abstract query, wherein the indication comprises at least one of: (i) a font color, (ii) a struck-out font, (iii) a background color, and (iv) a symbol;

executing the abstract query excluding the selected one or more conditional expressions, comprising:

generating a temporary abstract query based on the abstract query and the selected one or more conditional expressions, wherein the temporary abstract query excludes the selected one or more conditional expressions;

transforming the generated temporary abstract query into an executable query; and executing the executable query against the underlying physical data to produce a set of query results; and returning a set of results of executing the abstract query to the query interface.

14. The system of claim 13, wherein transforming the abstract query is performed on the basis of the abstraction model.

15. The system of claim 13, wherein presenting each of the one or more conditional expressions with an indication comprises presenting each of the one or more conditional expressions in a struck-out font.

16. The system of claim 13, wherein the presented indication communicating that the respective conditional expression is disabled comprises one of: (i) a font color, (ii) a background color, and (iii) a symbol.

17. The system of claim 13, wherein any of the one or more conditional expressions may be selectively re-enabled by the user within the query interface.

18. The system of claim 13, further comprising permanently removing the one or more conditional expressions from the abstract query.

* * * * *